(12) United States Patent
Rehn et al.

(10) Patent No.: US 9,866,787 B2
(45) Date of Patent: Jan. 9, 2018

(54) METHOD FOR CONFIGURING NETWORKED CAMERAS

(75) Inventors: John Rehn, Malmö (SE); Joachim Ståhl, Lund (SE); Sebastian Hultqvist, Malmö (SE); Daniel Bengtsson, Lund (SE)

(73) Assignee: Axis AB, Lund (SE)

( * ) Notice: Subject to any disclaimer, the term of this patent is extended or adjusted under 35 U.S.C. 154(b) by 302 days.

(21) Appl. No.: 13/524,925

(22) Filed: Jun. 15, 2012

(65) Prior Publication Data

US 2012/0327245 A1 Dec. 27, 2012

Related U.S. Application Data

(60) Provisional application No. 61/499,816, filed on Jun. 22, 2011.

(30) Foreign Application Priority Data

Jun. 21, 2011 (EP) ..................................... 11170790

(51) Int. Cl.
*H04N 7/18* (2006.01)
*H04N 5/77* (2006.01)
*H04N 5/765* (2006.01)

(52) U.S. Cl.
CPC ............. *H04N 5/772* (2013.01); *H04N 5/765* (2013.01); *H04N 7/181* (2013.01)

(58) Field of Classification Search
USPC .............................. 348/E7.085, 159; 709/209
See application file for complete search history.

(56) References Cited

U.S. PATENT DOCUMENTS 8,208,033 B2 6/2012 Lundberg et al.
2003/0007785 A1* 1/2003 Shimizu ........................ 386/117
(Continued)

FOREIGN PATENT DOCUMENTS

JP 2004-172780 A 6/2004
JP 2005-167523 A 6/2005
(Continued)

OTHER PUBLICATIONS

Office Action in Japanese with an English Translation for Japanese Patent Application No. 2012-137984 dated May 7, 2013, 7 pp.

*Primary Examiner* — Mohammed Rahaman
*Assistant Examiner* — Asmamaw G Tarko
(74) *Attorney, Agent, or Firm* — Volpe and Koenig, P.C.

(57) ABSTRACT

A method for configuring a plurality of networked cameras includes sending a request to the plurality of networked cameras requesting information relating to enabled storage type of each networked camera, receiving a response from networked cameras. The response includes information relating to storage type enabled in networked camera. The method further includes determining storage type to use for each networked camera that are enabled to autonomously store images at a storage means, where the determining of storage type is performed based on the information relating to enabled storage types received from these networked cameras, and sending a storage instruction to each camera for which a storage type has been determined. The storage instruction instructs a camera to store captured images on a storage means of a specific type.

14 Claims, 4 Drawing Sheets

(56) References Cited

U.S. PATENT DOCUMENTS

| | | |
|---|---|---|
| 2003/0169285 A1* | 9/2003 | Smith et al. .................. 345/716 |
| 2004/0105005 A1* | 6/2004 | Yamamoto et al. .......... 348/159 |
| 2004/0105450 A1* | 6/2004 | Ikuta et al. ................... 370/401 |
| 2005/0036034 A1* | 2/2005 | Rea et al. .................. 348/207.1 |
| 2006/0195574 A1* | 8/2006 | Sakai ............................ 709/225 |
| 2006/0204229 A1 | 9/2006 | Onodera |
| 2006/0284982 A1* | 12/2006 | Bigioi et al. ............... 348/207.1 |
| 2007/0098397 A1* | 5/2007 | Chen et al. ................... 396/429 |
| 2008/0120398 A1* | 5/2008 | Hiroki ........................... 709/219 |
| 2009/0103129 A1* | 4/2009 | Kurosawa .................... 358/1.15 |
| 2009/0174770 A1* | 7/2009 | Ogata et al. .................. 348/143 |
| 2009/0243794 A1 | 10/2009 | Morrow |
| 2009/0295925 A1* | 12/2009 | Miyamaki .......... H04N 1/00286 348/159 |
| 2010/0097463 A1* | 4/2010 | Tsuzuki et al. ............... 348/143 |
| 2011/0043631 A1* | 2/2011 | Marman et al. .............. 348/143 |
| 2011/0273567 A1* | 11/2011 | Bhan ............................. 348/159 |
| 2012/0113265 A1* | 5/2012 | Galvin ............... H04N 5/23206 348/159 |
| 2012/0206606 A1* | 8/2012 | Marchese ........... G06F 17/3025 348/159 |
| 2012/0327245 A1* | 12/2012 | Rehn ...................... H04N 5/772 348/159 |

FOREIGN PATENT DOCUMENTS

| | | |
|---|---|---|
| JP | 2010-011314 A | 1/2010 |
| TW | 200952468 A1 | 12/2009 |
| TW | 201008257 A1 | 2/2010 |
| WO | 2007069658 A1 | 6/2007 |

* cited by examiner

METHOD FOR CONFIGURING NETWORKED CAMERAS

TECHNICAL FIELD OF THE INVENTION

The present invention relates to systems including networked cameras and in particular to a method for configuring a plurality of networked cameras.

BACKGROUND OF THE INVENTION

Surveillance and monitoring systems are increasingly including digital network cameras. During installation of cameras in such a system a digital video management system generally is used to configure the cameras. Such a digital video management system is often part of a surveillance/monitoring central where all data, including video, is checked, stored, processed, etc. This is particularly true for large monitoring or surveillance systems including hundreds of cameras. Even smaller systems in which a local storage is performed usually uses at least one central surveillance computer or server which is arranged to request and receive or, in some cases, only receive streaming image data for processing and possibly storing.

The configuration of these types of systems includes accessing each camera and setting the streaming address of the camera to an address of the surveillance centre. Alternatively, the cameras are connected to a remote surveillance/monitoring centre or a remote video managing and storing centre, where the video data can be accessed for viewing and evaluation.

One problem with many of these types of surveillance/monitoring systems is that they are complicated to install and that they require a lot of onsite arranged hardware. These problems may be solved by having a service provider host the video offsite, i.e. using a service where each camera is automatically connected to a remote server which is controlled by a service provider and the person or organisation in charge of monitoring the site may access and be provided with the video from cameras, the alarms, etc, via servers of the service provider. However, using such a service provider the person/organisation responsible for the monitoring must be prepared to trust the service provider both from a quality perspective and from an perspective of personal integrity.

SUMMARY OF THE INVENTION

A method to improve the process of configuring networked cameras includes sending a request to the plurality of networked cameras, wherein the request is requesting information relating to enabled storage type of each networked camera and receiving a response from networked cameras. The response includes information relating to storage type enabled in networked camera. The method further includes determining storage type to use for each networked camera that are enabled to autonomously store images at a storage means, where the determining of storage type is performed based on the information relating to enabled storage types received from these networked cameras. A storage instruction is sent to each camera for which a storage type has been determined, wherein the storage instruction instructs a camera to store captured images on a storage means of a specific type.

One advantage of requesting information of storage capability for cameras and in particular for a plurality of cameras is that the configuration of a monitoring system including these cameras is facilitated. A further advantage is that the cameras are instructed to control the storage by themselves which leads to the possibility of having the monitoring system running without any central control/management unit and, thus, simplifying the monitoring system.

In one embodiment, the act of receiving a response includes receiving a response from each camera that is enabled to autonomously store images at a storage means.

In a further embodiment, the act of sending a request includes sending a separate request to each networked camera previously discovered in the system. By using a previously performed discovery process the configuration is further facilitated in that the user does not have to know the identity of the cameras. The user does not even need to know how many cameras being present in the system.

In yet a further embodiment, the act of sending a request includes broadcasting a request over the network.

In another embodiment, received response includes information relating to storage type, the storage type being selected from a group of storage types including at least: memory card and Networked Storage Device, NSD.

By including memory cards and NSDs in the storage types identified in the responses from the networked cameras, the storing scheme in the monitoring system may be optimised in view of reliability and/or capacity.

In a further embodiment, the information relating to storage type further indicates if the camera is generally enabled to be connected to an NSD for storing data or that the camera is presently connected to a specific NSD.

In yet another embodiment, the act of determining storage type to use includes determining that a networked camera is to use a memory card of the networked camera if the response from the networked camera indicates that a memory card is enabled for storing in the networked camera.

In another embodiment, the act of determining storage type to use includes determining that a networked camera is to use a Networked Storage Device, NSD, if the response from the networked camera indicates an NSD type device is enabled for storing and memory card is not included in the response as enabled for storing.

In a further embodiment, the storage instruction further includes a network address to an NSD.

In one embodiment, the act of determining storage type to use includes determining that all networked cameras that are enabled to autonomously store images at a storage means are to use a Networked Storage Device, NSD, as storage means if the response from any one of these networked cameras indicate that an NSD type device is enabled for storing and that a memory card is not included in the response as enabled for storing.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF EMBODIMENTS

Figure 1:
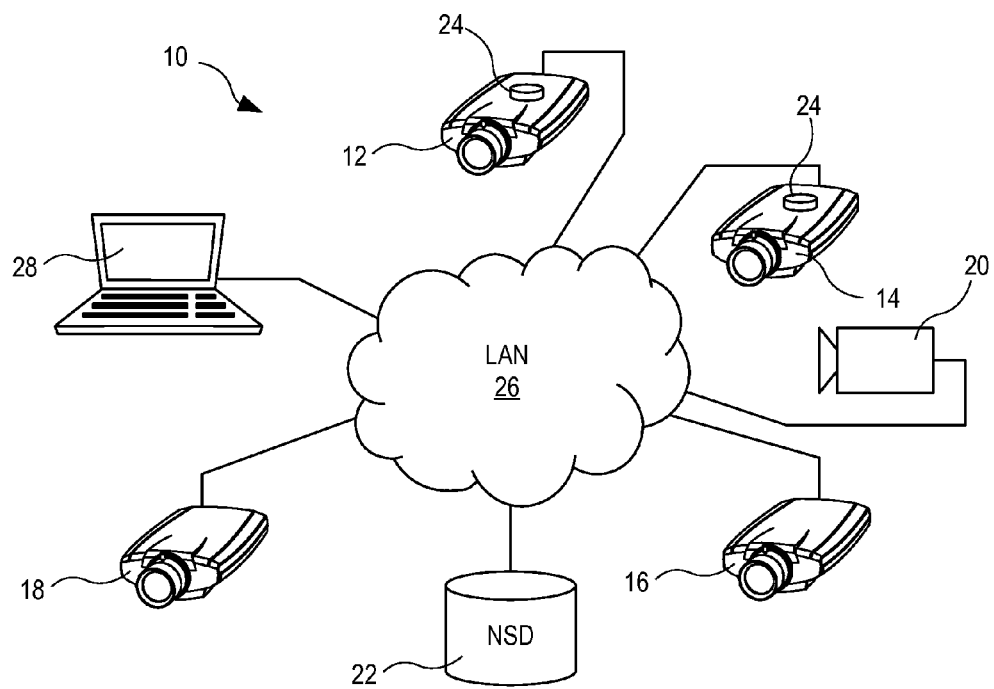
FIG. 1 is a schematic block diagram over a system, in which an implementation of the present invention may be used.
Figure 2:
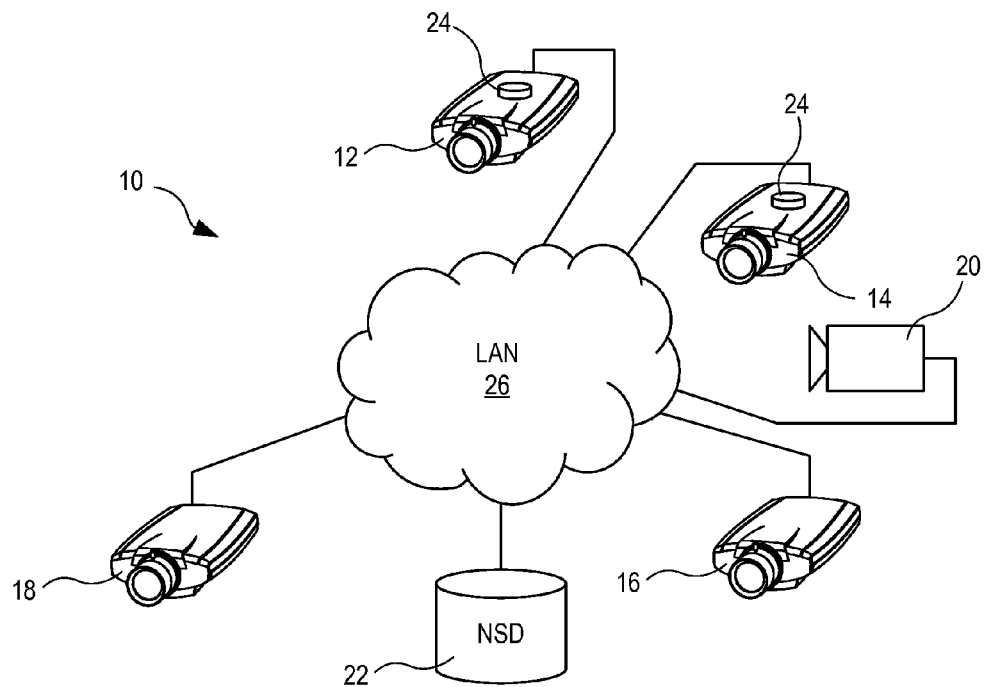
FIG. 2 is a schematic block diagram over the system of FIG. 1 and a possible arrangement when no configuration of cameras is performed.

The present invention relates to a surveillance and/or monitoring, system 10 including networked cameras 12-20 for capturing moving images and at least some locally arranged storage means, e.g. a Networked Storage Device 22, NSD, a memory card 24 mounted in a slot in the camera 12-14, see FIGS. 1 and 2. An NSD 22 may be any type of networked storage device, e.g. a Network Attached Storage, NAS, a file server, a computer sharing a storage area, e.g. defined as a directory, with networked devices.

The networked cameras 12-20 may be networked cameras enabled to capture and provide moving images, still images, metadata relating to the monitoring, etc. over local computer network 26, e.g. a Local Area Network, LAN. The system may be smaller or bigger than the system depicted in FIGS. 1-2 and may include any combination of networked camera types. For instance, the system may include networked cameras 12-14 comprising a slot for a memory card in which slot a memory card is inserted in order to record captured images and/or video, networked cameras 16-18 arranged to store captured images and/or video on an NSD, and/or cameras 20 not enable to store acquired images and/or video to an integrated memory cards or to an NSD. The cameras may be arranged to acquire both still images and moving video or only moving images, but in order to facilitate the continued description the cameras will henceforth be referred to as acquiring video without narrowing the scope of the acquired data to only moving video.

The cameras 12-14 including a memory card may also be capable of storing video in a NSD and of streaming video to a particular address. The memory cards may be of any suitable type that is easily replaceable, e.g. any variants of a Secure Digital card, SD-card, a Compact Flash card, CF-card, a memory stick, a USB flash drive, a USB memory stick, a USB hard drive, etc.

The cameras 16-18 that are arranged to store captured video on an NSD may be a camera having a card slot for a memory card but not having any memory card inserted or a camera not having such a card slot at all. In any of these two configurations the cameras 16-18 may be enabled to stream video.

According to one embodiment the camera 20 is a camera type that is capable of streaming video to one or a plurality of addresses. According to this embodiment this camera are not able to write video data to an NSD and do not include any memory card slot for inserting a memory card for storing video.

Moreover according to one embodiment, a client computer 28 is connected to the network 26 at least during a configuration phase and when video stored at the local storage devices 22, 24, are to be viewed, downloaded or processed in any other way, see FIG. 1. The monitoring surveillance system may be active and running without having any client computer connected to the cameras or NSDs of the system, as shown in FIG. 2.

Figure 3:
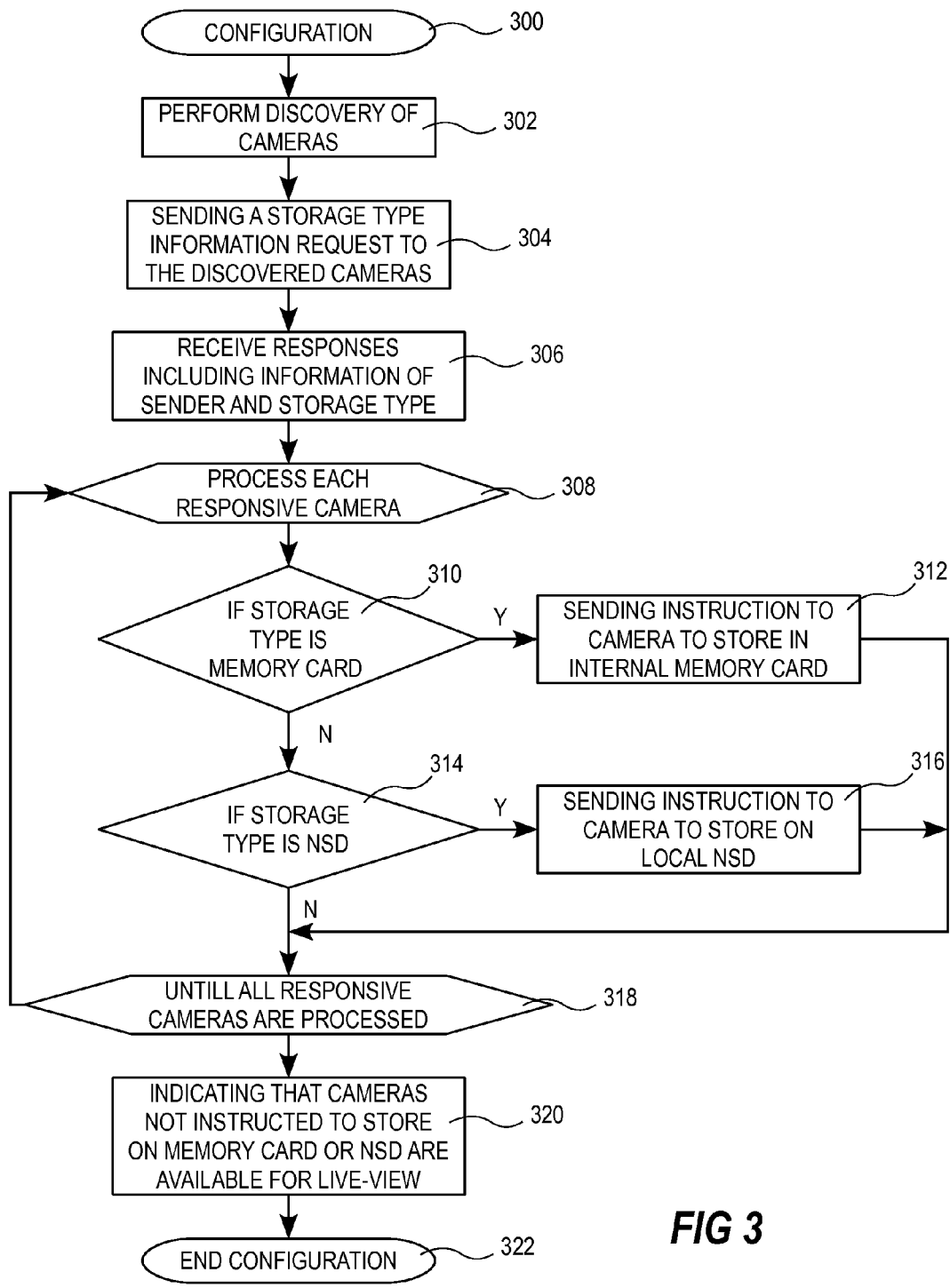
FIG. 3 is a flowchart of a method according to one embodiment of the invention.

In order to facilitate installation of the system and configuration of the cameras, a client computer is connected to the network, to which the cameras and the NSDs already have been connected. According to one embodiment, the client computer then performs the configuration process 300 shown in FIG. 3. This process starts with the client computer performing a discovery process of the network and receiving identifiers identifying the cameras 12-20 connected to the network, step 302. A storage type information request is then sent to the discovered cameras, step 304. In response to the storage type information request, responses are received from at least cameras enable to store information on a camera located memory card or at an NSD, step 306. The response includes information enabling identification of the sending device, e.g. a data network address, an IP-address, a MAC-address, a serial number, etc. Moreover, the response includes information indicating the storage capability of the camera, e.g. if it has a memory card inserted for storing and if it is capable of storing on an NSD. A camera may respond with a single storage capability, however, if it has a memory card inserted and is capable of storing at an NSD the camera may respond indicating both capabilities. The cameras may be enabled to provide additional types of responses in view of storage capability.

When information regarding the storage capability have been received from the cameras having this capability, the information of each camera is processed, step 308. This processing of information relating to each camera includes checking if a response from the presently processed camera indicates that the camera is able to store on a memory card located at the camera, step 310. If such storage is available then an instruction is sent to the camera instructing it to store on the memory card, step 312. Then the process continues processing the information of the next responsive camera, steps 318 and 308.

If the response from the presently processed camera does not indicate that the camera is able to store on a memory card located at the camera, step 310, then the process continues to step 314 where it checks if the response from the camera indicates that the camera is able to store video on an NSD, step 314. If the response indicates that the camera is able to store on an NSD, but not on a memory card, then instructions are sent to the camera instructing it to store the video on a local NSD, step 316. These instructions may include an address to an NSD. However, the information from the camera may have indicated that the camera already is connected to an NSD for storing video and in such a case the instructions to the camera may be to continue using that NSD. Then the process continues by processing the information of the next responsive camera, steps 318 and 308.

If the checking in step 314 indicates that no capability of storing to an NSD is available, then the process continues processing the information of the next responsive camera, steps 318 and 308, without sending any instructions.

When all responsive cameras have been processed, the process may indicate in a register that the cameras not instructed to store on any storage means are available for live view, step 320. Then the configuration process is ended, step 322.

Figure 4:
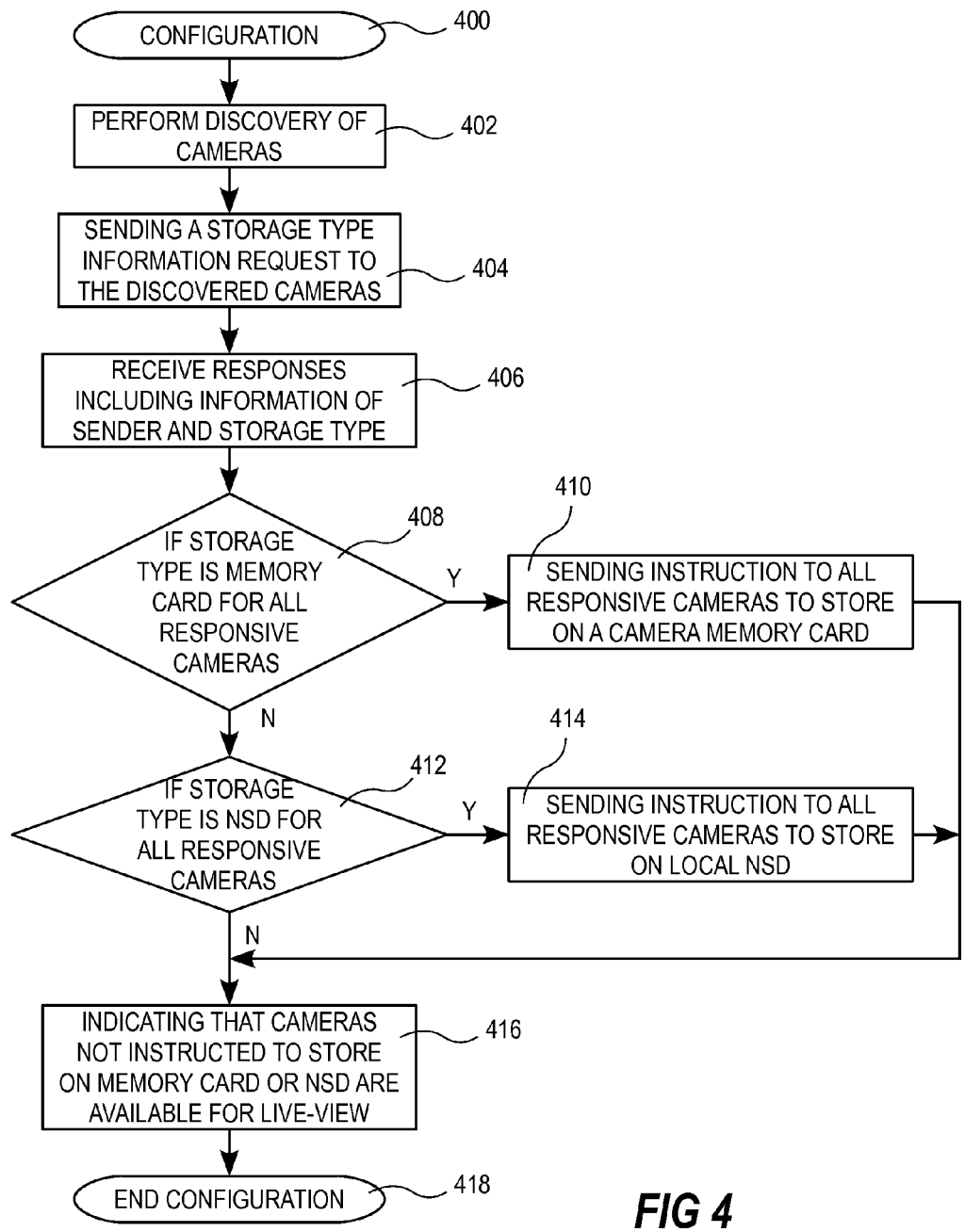
FIG. 4 is a flowchart of a method according to an alternative embodiment of the invention.

According to another embodiment, the client computer performs the configuration process 400 shown in FIG. 4. This process starts with the client computer performing a discovery process of the network and receiving identifiers identifying the cameras 12-20 connected to the network, step 402. A storage type information request is then sent to the discovered cameras, step 404. In response to the storage type information request, responses are received from at least cameras enable to store information on a camera located memory card or at an NSD, step 406. The response includes information enabling identification of the sending device, e.g. a data network address, an IP-address, a MAC-address, a serial number, etc. Moreover, the response includes information indicating the storage capability of the camera, e.g. if it has a memory card inserted for storing and if it is capable of storing on an NSD. A camera may respond with a single storage capability, however, if it has a memory card inserted and it is capable of storing at an NSD, the camera may respond indicating both capabilities. The cameras may be enabled to provide additional types of responses in view of storage capability.

Then a check, step 408, of all the responses are performed in order to find out if all the responsive cameras indicates that they are able to store image data on a memory card at the camera, i.e. that there is a memory card connected to the camera and not only that the camera have a memory card slot. If all responsive cameras are enabled to store on a memory card, then an instruction is sent to all these responsive cameras to configure them to store on the memory card, then the process continues at step 416, which will be described below.

If any one of the responsive cameras does not indicate that it is able to store on a memory card, then the process continues to step 412 where it checks if all responsive cameras are able to store on an NSD. If they are, then an instruction message is sent to all responsive cameras. The instruction message instructs the recipients to store video on a local NSD. The message may include an address to a specific NSD or an indication to use an NSD already registered for use in the camera. After the instruction has been sent the process continues to step 416.

However, if there is any responsive camera not able to store on an NSD then the process continues with indicating that the cameras not instructed to store on memory card or NSD are available for live-view, step 416. Then the process is ended, step 418. Alternatively, if the check at step 412 indicates that there is a camera not able to store on an NSD then the process may process each responsive camera in accordance with steps 308-318 of FIG. 3 and then return to step 416.

Figure 5:
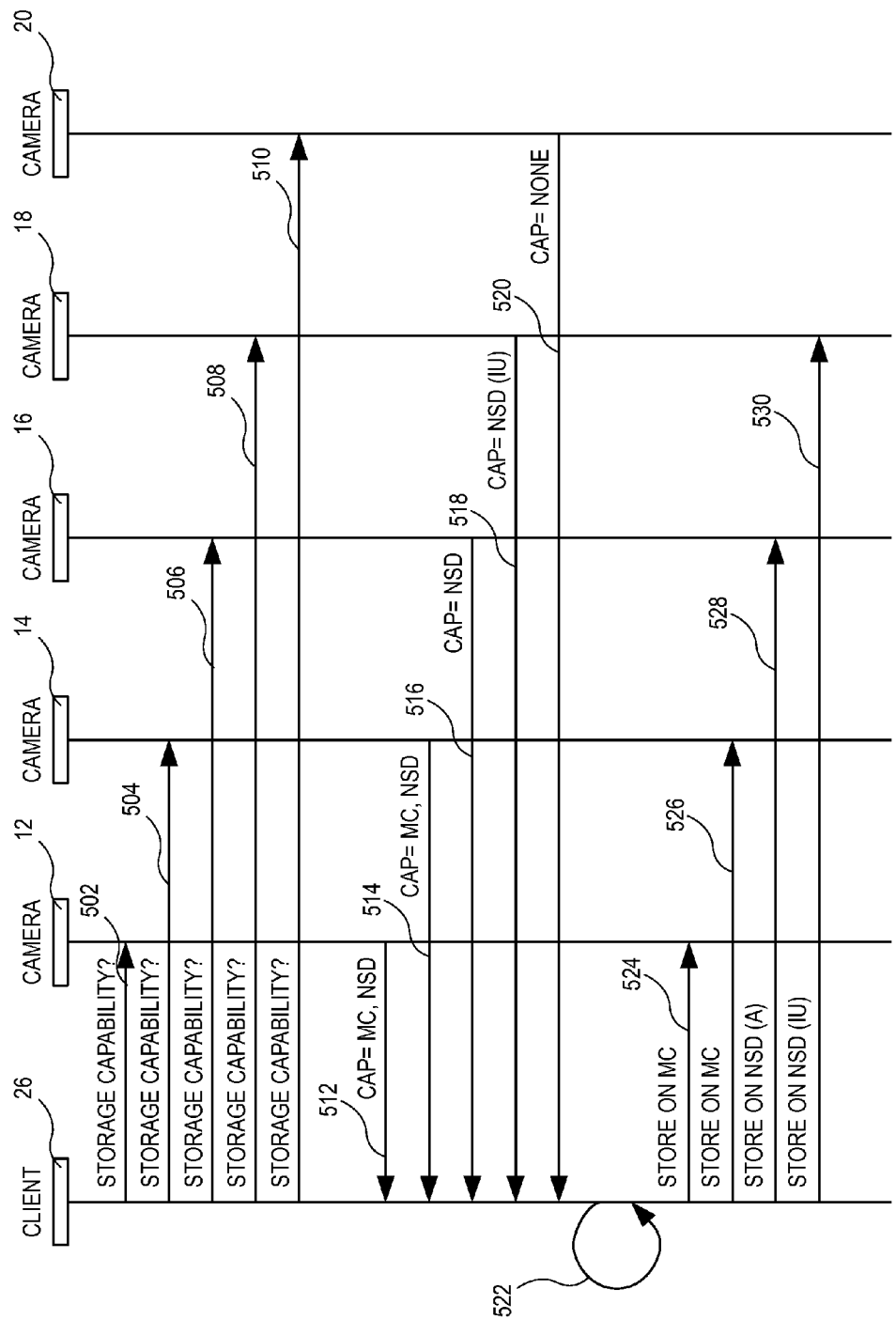
FIG. 5 is a timing diagram showing the communication between a client and the cameras during at least a part of the configuration according to one embodiment of the invention.

In FIG. 5, the signalling between the client 26 and the cameras 12-20 according to one embodiment is shown. As described in connection with the description of the respective processes of FIG. 3 and FIG. 4, the client has performed a discovery and then it sends storage capability information request messages 502-510 to each of the cameras. Assuming the system described in connection with FIGS. 1 and 2, the response messages may be as follows. Camera 12 sends a response in the form of a capability message 512, including indications that camera 12 is able to store on camera arranged memory card (MC) and/or on a local NSD. Camera 14 also has a memory card and hence the capability message 514 from camera 14 includes indications that camera 12 is able to store on camera arranged memory card (MC) and/or on a local NSD. Camera 16 does not have any memory card it may have a memory card slot with no memory card inserted, but have the capability of storing on NSDs. Therefore camera 16 sends a capability message 516 only indicating that it is able to store on an NSD. Camera 18 is still connected to an NSD for storing video and therefore responds with a capability message 518 indicating that it is able to store on an NSD and that it presently is configured to store on an NSD(IU), i.e. an NSD already used by the camera. The presently used NSD may be identified in the capability message 518 by using a network address, a serial number, or any other suitable identification means. Camera 20 is not able to store on a memory card or on an NSD and, thus, camera 20 may respond by sending an capability message 520 indicating that it is not able to store on any of the storage means. The camera 20 may even be of a type that lack means and/or capacity to recognise the capability information request message 510 and therefore is unable to respond. In such case, the client may be arranged to interpret a non-responsive camera as being a camera capable of streaming, but not storing at a NSD or on a memory card of the camera.

The client may then process 522 the received responses, e.g. by means of one of the above described processes, and generates instructions to at least the cameras able to store on an NSD or on a memory card of the camera. For instance, the client may send an instruction 524 ordering camera 12 to store video on the memory card, an instruction 526 ordering camera 14 to store video on the memory card, an instruction 528 ordering camera 16 to store video on a NSD having address A, and an instruction 530 ordering camera 18 to store video on the NSD already in use by camera 18.

The invention claimed is:

1. A method for configuring a plurality of networked cameras, the method comprising:
sending, by a configuration computer, a request to the plurality of networked cameras wherein the request is requesting information relating to enabled storage type of each networked camera to set an initial configuration for the plurality of networked cameras;
receiving, at the configuration computer, a response from each networked camera, the response includes information relating to storage type enabled in each networked camera, wherein the information relating to the storage type indicates whether the networked camera uses at least one of a memory card or a Networked Storage Device (NSD) for storing images;
determining, at the configuration computer, storage type to use for each networked camera that are enabled to autonomously store images at a storage means, the determining of storage type are performed based on the information relating to enabled storage types received from each of the networked cameras as available, wherein the determining the storage type to use for each networked camera includes determining that a networked camera is to use a memory card of the networked camera if the response from the networked camera indicates that a memory card is enabled for storing in the networked camera and determining that a networked camera is to use a NSD if the response from the networked camera indicates an NSD type device is enabled for storing and memory card is not included in the response as enabled for storing; and sending, by the configuration computer, a storage instruction to each networked camera for which a storage type has been determined to be used, wherein the storage instruction instructs each camera to store captured images on the type of storage means determined to be used, wherein the configuration computer is not a networked camera and is disconnected after setting the initial configuration.

2. The method for configuring a plurality of networked cameras according to claim 1, wherein the act of receiving a response includes receiving a response from each camera that is enabled to autonomously store images at a storage means.

3. The method for configuring a plurality of networked cameras according to claim 1, wherein the information relating to storage type further indicates if the camera is enabled to be generally connect to an NSD for storing data or that the camera is presently connected to a specific NSD.

4. The method for configuring a plurality of networked cameras according to claim 1, wherein the storage instruction further includes a network address to an NSD.

5. The method for configuring a plurality of networked cameras according to claim 1, wherein the act of determining storage type to use includes determining that all networked cameras that are enabled to autonomously store images at a storage means are to use a Networked Storage Device, NSD, as storage means if the response from any one of these networked cameras indicate that an NSD type device is enabled for storing and that a memory card is not included in the response as enabled for storing.

6. The method for configuring a plurality of networked cameras according to claim 1, wherein in the event no response is received from a particular networked camera, set a default indication for the particular networked camera.

7. The method for configuring a plurality of networked cameras according to claim 1, wherein in the event no response is received from a particular networked camera, indicate live view available for the particular networked camera.

8. The method for configuring a plurality of networked cameras according to claim 1, wherein in the event no storage type is available for a particular networked camera, indicate live view available for the particular networked camera.

9. A method for configuring a plurality of networked cameras, the method comprising:

requesting, by a configuration computer, from each of the plurality of networked cameras enabled storage type information to set an initial configuration for the plurality of networked cameras;

receiving, by the configuration computer, responses from the plurality of networked cameras, wherein a response includes enabled storage type information for a particular network camera, wherein the enabled storage type information indicates whether the networked camera uses at least one of a memory card or a Networked Storage Device (NSD) for storing images;

determining, by the configuration computer, based on a corresponding response, storage type for each networked camera that is enabled to autonomously store images at a storage means, wherein the determining the storage type to use for each networked camera includes determining that a networked camera is to use a memory card of the networked camera if the response from the networked camera indicates that a memory card is enabled for storing in the networked camera and determining that a networked camera is to use a NSD if the response from the networked camera indicates an NSD type device is enabled for storing and memory card is not included in the response as enabled for storing; and sending, by the configuration computer, a storage instruction to set the initial configuration for each networked camera for which a storage type has been determined to be used, wherein the storage instruction instructs the networked camera to store captured images on the type of storage means determined to be used, and disconnecting the configuration computer after setting the initial configuration.

10. The method for configuring a plurality of networked cameras according to claim 9, wherein the act of receiving a response includes receiving a response from each networked camera that is enabled to autonomously store images at a storage means.

11. The method for configuring a plurality of networked cameras according to claim 9, wherein the information relating to storage type further indicates if the camera is enabled to be generally connect to an NSD for storing data or that the camera is presently connected to a specific NSD.

12. The method for configuring a plurality of networked cameras according to claim 9, wherein the storage instruction further includes a network address to an NSD.

13. The method for configuring a plurality of networked cameras according to claim 9, wherein the act of determining storage type to use includes determining that all networked cameras that are enabled to autonomously store images at a storage means are to use a Networked Storage Device, NSD, as storage means if the response from any one of these networked cameras indicate that an NSD type device is enabled for storing and that a memory card is not included in the response as enabled for storing.

14. The method for configuring a plurality of networked cameras according to claim 9, wherein in the event no response is received from a particular networked camera, set a default indication for the particular networked camera.

* * * * *